United States Patent Office 3,479,379
Patented Nov. 18, 1969

3,479,379
PROCESS FOR PREPARING PALLADIUM-π-ALLYL COMPLEXES
Arthur D. Ketley, Silver Spring, Md., assignor to W. R. Grace & Co., New York, N.Y., a corporation of Connecticut
No Drawing. Filed Dec. 26, 1967, Ser. No. 693,088
Int. Cl. C07f 15/00; B01j 11/12; C08d 1/12
U.S. Cl. 260—429
10 Claims

ABSTRACT OF THE DISCLOSURE

In abstract this invention is directed to a process for preparing a palladium-π-allyl complex, said process comprising agitating a mixture of a stoichiometric excess of a weakly basic sodium salt and a palladium (II) salt-olefin complex.

This invention is in the field of palladium-π-allyl complexes.

In the prior art, π-allyl complexes, including those of palladium, have been prepared by reacting metal halides with allyl Grignard reagents. A review of π-allyl complexes is presented by Wilke et al. in Angewandte Chemie, International Edition, volume 5, number 2 (February 1966), pages 151–166.

In summary this invention is directed to a process for preparing a palladium-π-allyl complex, said process comprising agitating a mixture of a stoichiometric excess of a weakly basic sodium salt and a palladium (II) salt-olefin complex, said complex having the formula $PdX_2$(olefin), where X is selected from the group consisting of chloride, bromide, iodide, acetate, and formate ions, and where the olefin is an olefin having a boiling point of about −40 to 200° C. in a reaction zone in the presence of an inert solvent for about 15–600 minutes while maintaining the temperature within the reaction zone at about 0–50° C., separating, and recovering the palladium-π-allyl complex.

In preferred embodiments of the process set forth in the above summary:

(1) The olefin has a boiling point of about −35 to +50° C.;

(2) The mixture is agitated for about 30–180 minutes;

(3) The temperature within the reaction zone is maintained at about 20–30° C.;

(4) X is chloride ion;

(5) The olefin is selected from the group consisting of olefins having 3–10 carbon atoms and one double bond per molecule;

(6) The weakly basic sodium salt is selected from the group consisting of sodium carbonate, sodium bicarbonate, disodium hydrogen phosphate, sodium acetate, sodium formate;

(7) The solvent is an inert solvent selected from the group consisting of saturated aliphatic hydrocarbons containing 4–10 carbon atoms, saturated cycloaliphatic hydrocarbons containing 4–10 carbon atoms, aromatic hydrocarbons containing 6–12 carbon atoms, chlorinated hydrocarbons containing 1–4 carbon atoms, and nitroalkanes containing 1–4 carbon atoms; and (8) The palladium-π-allyl complex is separated from the reaction mixture by filtering off solid material consisting essentially of the weakly basic sodium salt and reaction products of said salt and removing excess solvent by evaporation under reduced pressure.

In another preferred embodiment (Embodiment A) this invention is directed to a process for preparing a palladium-π-allyl complex, said process comprising:

(a) Forming a first mixture consisting essentially of an inert solvent and a palladium (II) salt-olefin complex having the formula $PdX_2$(olefin, where; (i) X is selected from the group consisting of chloride, bromide, iodide, acetate, and formate ions; and (ii) the olefin is an olefin having a boiling point of about −40° to +200° C. (about −35 to +50° C. for optimum results) by reacting, in a reaction zone in the presence of an inert solvent, a palladium salt having the formula $PdX_2$, where X is selected from the group consisting of chloride, bromide, iodide, acetate, and formate ions with a stoichiometric excess of the aforesaid olefin in a reaction zone in the presence of a solvent (an inert solvent) for about 30–300 minutes (about 60–120 minutes for optimum results) while maintaining the temperature within the reaction zone at about 0–50° C. (about 20–30° C. for optimum results) for about 30–300 minutes (about 60–120 minutes for optimum results);

(b) Forming a second mixture consisting essentially of an inert solvent, a palladium-π-allyl complex, a weakly basic sodium salt, and reaction products of said sodium salt by adding a stoichiometric excess of a said sodium salt to the first mixture in the reaction zone while agitating the first mixture and while maintaining the temperature in the reaction zone at about 0–50° C. (about 20–30° C. for optimum results) for about 15–600 minutes (about 30–180 minutes for optimum results); and (c) Separating and recovering the palladium-π-allyl complex.

In a preferred embodiment of the process set forth in Embodiment A, supra, the solvent is an inert solvent selected from the group consisting of saturated aliphatic hydrocarbons containing 4–10 carbon atoms, saturated cycloaliphatic hydrocarbons containing 6–10 carbon atoms, aromatic hydrocarbons containing 6–12 carbon atoms, chlorinated hydrocarbons containing 1–4 carbon atoms and nitroalkanes containing 1–4 carbon atoms.

In another preferred embodiment (Embodiment B) this invention is directed to a process for preparing a palladium-π-allyl complex, said process comprising:

(a) Forming said palladium-π-allyl complex by forming a first mixture by adding a palladium salt selected from the group consisting of palladium (II) chloride, palladium (II) bromide, palladium (II) iodide, palladium (II) acetate, and palladium (II) formate; (ii) an inert solvent; (iii) a stoichiometric excess of a weakly basic sodium salt; and (iv) a stoichiometric excess of an olefin having a boiling point within the range of about −40 to +200° C. (about −35 to 50° C. for optimum results) to a reaction zone provided with agitating means, and agitating said first mixture for about 15–600 minutes (about 30–180 minutes for optimum results) while maintaining the temperature within said zone at about 0–50° C. (about 20–30° C. for optimum results);

(b) Separating and recovering said palladium-π-allyl complex.

It is an object of this invention to provide an improved process for preparing palladium-π-allyl complexes.

It is an object of this invention to provide a process for preparing a palladium-π-allyl complex from a palladium salt-olefin complex and a weakly basic sodium salt.

Other objects of this invention will, as a result of the instant disclosure, be readily apparent to those skilled in the art.

As used herein the term "a weakly basic sodium salt" means a sodium salt, a 0.1 normal aqueous solution of which will have a pH of about 8–12 at room temperature (i.e., ca. 20–30° C.); examples of such salts are sodium bicarbonate, sodium carbonate, sodium formate, sodium acetate, and disodium hydrogen phosphate. Strongly basic sodium compounds such as sodium hydroxide and trisodium phosphate are unsatisfactory for use in the process of this invention. Acid salts such as sodium bisulfate are unsatisfactory in the process of this invention. Weakly basic salts of other alkali metals such as potassium and lithium are unsatifactory for use in the process of this invention.

Although the invention of this specification is not dependent upon theory it is believed that weakly basic sodium salts reacts with ("neutralize") acid formed when a palladium (II) salt-olefin complex is converted to a palladium-$\pi$-allyl complex as represented by the following equation:

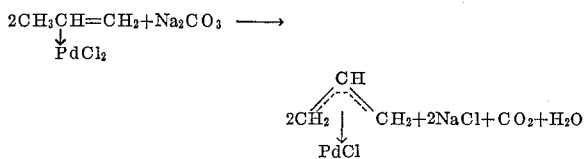

As used herein the term "a stoichiometric excess of a weakly basic sodium salt" means that a sufficient quantity of said sodium salt to maintain the resulting system (the system formed by mixing said salt and a palladium (II) salt-olefin complex) alkaline after the reaction to form a palladium-$\pi$-allyl complex has ceased has been added to the palladium (II) salt-olefin complex. Usually, considerably more than a bare stoichiometric excess of said sodium salt is used as a matter of convenience. However, excellent results have been obtained with very slight excesses (e.g., 0.2–0.5% in excess of stoichiometric)—however 25–50% or higher in excess of stoichiometric are generally preferred because of the low price of sodium salts and the high price of palladium (II) salts.

As used herein the term "a stoichiometric excess of the aforesaid olefin" (and similar terms or expressions) means that a quantity of olefin in excess of 1 mole of olefin per mole of palladium (II) salt is used. Excellent results have been obtained using very slight excesses of said olefin (e.g., about 0.2–0.5%) however, for reasons of economics, larger excesses of said olefin are generally preferred (see the examples, infra) because of the relatively low cost of olefins and the high cost of palladium (II) salts. Further, if the olefin is a liquid at the temperature at which the palladium (II) salt-olefin complex is converted into a palladium-$\pi$-allyl complex, an excess of said olefin can serve as solvent ("inert solvent") for conducting the reaction wherein the salt-olefin complex is converted into a $\pi$-allyl complex (see Example 12, infra).

The term "inert" as applied to a solvent in which a palladium (II) salt-olefin complex is converted to a palladium-$\pi$-allyl complex means that said solvent does not interfere with, hinder, retard, or prevent the formation of said $\pi$-allyl complex.

Although the process of this invention is not dependent on theory, the following equations, using typical reactants, represent the reactions believed to be involved in the process of this invention.

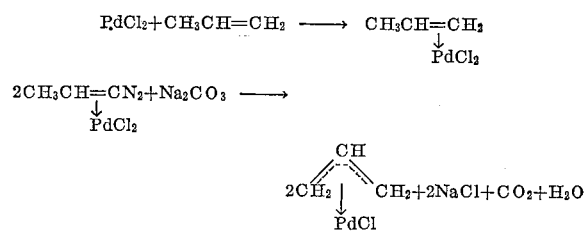

Palladium-$\pi$-allyl complexes, including such complexes prepared by the method of this invention are excellent catalysts for polymerizing 1,3-butadiene to prepare "rubber" excellently adapted for use in making gaskets and for use as a material for sealing tin cans (see Example 16, infra). Also see pages 160–161 of Wilke et al. (cited supra).

Substantially any weakly basic salt of sodium hydroxide and a weak acid (e.g., acetic acid, carbonic acid, formic acid, phosphoric acid, and the like) can be used in the process of this invention providing that said salt is not one (such as NaCN and the like) which forms a complex with palladium salts. Ammonia, amines, and their salts are not acceptable because such compounds also form complexes with palladium salts. The reason (or reasons) that weakly basic salts of metal such as potassium and lithium fail in the process of this invention is not understood.

Olefins excellently adapted for use in the process of this invention include but are not limited to propene, butene-1, butene-2, 4-methyl-1-pentene, octene-1, hexene-3, and vinylcyclohexane.

Diolefins, e.g., the butadienes and the like and tri- and polyolefins cannot be used in the process of this invention, said process being limited to monoolefins having boiling points within the ranges of about −40 to +200° C.

The instant invention will be better understood by referring to the following specific but nonlimiting examples. It is understood that said invention is not limited by these examples which are offered merely as illustrations and it is also understood that modifications can be made without departing from the spirit and scope of the invention.

EXAMPLE 1

A 1 g. (0.0056 mole) portion of $PdCl_2$ was mixed with 7 ml. of 2-methyl-1-pentene in 25 ml. of ethanol-free chloroform in a stirred reaction flask while maintaining the temperature of the flask and its contents at about 20–25° C. A 5 g. (0.047 mole) portion of $Na_2CO_3$ was added to the flask and the resulting mixture was stirred at room temperature (ca. 20–25° C.) for about 5 hours. At the end of this time the reaction mixture was filtered to remove $Na_2CO_3$, $NaHCO_3$, and $NaCl$ as filter cake. The filter cake was washed with two 5 ml. portions of the aforesaid chloroform and the washings were added to the filtrate. The filtrate was collected and the chloroform and unreacted excess 2-methyl-1-pentene was evaporated therefrom under vacuum (e.g., ca. 25° C. at ca. 50 mm. of Hg pressure). Solid product representing a yield (based on palladium (II) chloride charged) of about 70% of theory was recovered. Nuclear magnetic resonance established that said product was bis (2n-propyl-$\pi$-allylpalladium chloride),

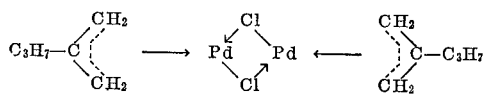

EXAMPLE 2

The general procedure of Example 1 was repeated but in this instance the olefin was propylene, and said olefin, in the vapor phase, was passed into the $PdCl_2$-chloroform mixture at a rate of about 5 liters (measured at 0° C. and 760 mm. of Hg pressure) per hour until substantially all of the $PdCl_2$ had combined with the olefin to form a $PdCl_2$-olefin complex ($PdCl_2(CH_3CH=CH_2)$), at which time the $Na_2CO_3$ was added to the reaction mixture. The results were substantially identical with those of Example 1 except that the product was unsubstituted $\pi$-allyl palladium chloride.

EXAMPLE 3

The general procedure of Example 1 was repeated; however, in this instance the $Na_2CO_3$ was replaced on a mole-for-mole basis with sodium acetate. The results of this run were substantially identical with those of Example 1.

EXAMPLE 4

The general procedure of Example 1 was repeated; however, in this instance 10 g. of $Na_2CO_3$ was used. The results of this run were substantially identical to those of Example 1.

EXAMPLE 5

The general procedure of Example 1 was repeated; however, in this instance about 1 g. of $Na_2CO_3$ was used. The results of this run were substantially identical with those of Example 1.

EXAMPLE 6.

The general procedure of Example 1 was repeated. However, in this instance, the $PdCl_2$ was replaced on a mole-for-mole basis with palladium acetate. The results of this run were substantially identical with those of Example 1 except that the product was bis (2n-propyl-π-allylpalladium acetate).

EXAMPLE 7

The general procedure of Example 1 was repeated; however, in this instance the $Na_2CO_3$ was replaced on about a mole-for-mole basis with sodium formate. The results of this run were substantially identical with those of Example 1.

EXAMPLE 8

The general procedure of Example 1 was repeated; however, in this instance the chloroform was replaced by about an equal volume of n-hexane. The results of this run were substantially identical with those of Example 1.

EXAMPLE 9

The general procedure of Example 1 was repeated; however, in this instance the chloroform was replaced by an equal volume of benzene. The results of this run were substantially identical with those of Example 1.

EXAMPLE 10

The general procedure of Example 1 was repeated; however, in this instance the chloroform was replaced with an equal volume of 1-nitropropane. The results of this run were substantially identical with those of Example 1.

EXAMPLE 11

The general procedure of Example 1 was repeated; however, in this instance the chloroform was replaced with 20 ml. of cyclohexane. The results of this run were substantially identical with those of Example 1.

EXAMPLE 12

The general procedure of Example 1 was repeated; however, in this instance the ethanol-free chloroform was omitted and 35 ml. of 2-methyl-1-pentene was added—the excess 2-methyl-1-pentene serving as solvent where preparing the palladium (II) chloride-2-methyl-1-pentene complex (palladium (II) chloride-olefin complex) and where forming the palladium-π-allyl complex of palladium (II) chloride and 2-methyl-1-pentene. Since 2-methyl-1-pentene does not inhibit, prevent, retard, or otherwise interfere with the formation of either the palladium (II) chloride-olefin complex or the π-allyl complex, it (the excess 2-methyl-1-pentene) is an inert solvent where used in the reaction by which the palladium (II) chloride-olefin complex is formed and in the reaction by which the π-allyl complex is formed from the palladium (II) chloride-olefin complex. The results obtained in this run were substantially identical with those obtained in Example 1.

EXAMPLE 13

1.0 g. of π-complex of propylene with $PdCl_2$ $$(PdCl_2(CH_3CH=CH_2))$$

(prepared by passing propylene into a mixture of $PdCl_2$ and ethanol-free chloroform) and 5.0 g. of $K_2CO_3$ were refluxed for 5 hours in 25 ml. of ethanol-free chloroform. The reaction solution was filtered and evaporated to dryness. The product was the unchanged complex of propylene with $PdCl_2$ plus some unidentified material. No palladium-π-allyl complex was obtained.

EXAMPLE 14

1.0 g. of the aforesaid π-complex of propylene with $PdCl_2(PdCl_2(CH_3CH=CH_2))$ and 5.0 g. of $Li_2CO_3$ (anhydrous) were stirred at 25° C. in 25 ml. of ethanol-free $CHCl_3$ for 5 hours. The reaction solution was filtered and evaporated to dryness. Only the unchanged π-complex was recovered; no palladium-π-allyl complex was obtained.

EXAMPLE 15

2.0 g. of the aforesaid π-complex of propylene with $PdCl_2(PdCl_2(CH_3CH=CH_2))$ and 5.0 g. of dry NaOH were stirred at 25° C. for 3 hours in 25 ml. of ethanol-free $CHCl_3$. The reaction solution turned black. On filtering and evaporation of solvent, no palladium-π-allyl complex was obtained.

EXAMPLE 16

A 1 g. portion of a palladium-π-allyl complex prepared by the procedure of Example 1, supra, was dissolved in about 100 ml. of benzene and 1,3-butadiene was bubbled into the resulting solution for about 2 hours at the rate of about 20 g. per hour while maintaining the temperature of said solution at about 40–45° C. This treatment converted substantially all of the butadiene into a soft solid polymer. Said polymer was separated from the benzene solution of palladium-π-allyl complex and vulcanized by blending with sulfur and heating. The resulting vulcanized "rubber" was excellently adapted for use in making gaskets and for use as a material for sealing "tin" cans.

EXAMPLE 17

A reaction mixture was prepared by charging 1 g. of $PdCl_2$, 25 ml. of ethanol-free chloroform, and 5 g. of $NaHCO_3$ into a reaction zone. Propylene was passed through said reaction mixture at about 5 liters (measured at 0° C. and 760 mm. of mercury pressure) per hours until substantially all of the $PdCl_2$ had reacted. The resulting slurry was filtered. The filter cake was washed with two 5 ml. portions of the aforesaid chloroform, and the washings were added to the filtrate. The combined filtrate and washings were evaporated under vacuum (e.g., ca. 25° C. at ca. 60 mm. of mercury pressure). Unsubstituted π-allylpalladium chloride was recovered in excellent yield and quality.

EXAMPLE 18

The general procedure of Example 13 was repeated, but in this instance the procedure was modified by replacing the $K_2CO_3$ with $Na_2CO_3$. Unsubstituted π-allylpalladium chloride was obtained in excellent yield and quality.

I claim:

1. A process for preparing a palladium-π-allyl complex, said process consisting of agitating a mixture of a stoichiometric excess of a weakly basic sodium salt and a palladium (II) salt-olefin complex, said complex having the formula $PdX_2$ (olefin), where X is selected from the group consisting of chloride, bromide, iodide, acetate, and formate ions, and where the olefin is a mono-olefin having a boiling point of about −40 to +200° C. in a reaction zone in the presence of an inert solvent for about 15–600 minutes while maintaining the temperature within the reaction zone at about 0°–50° C., separating, and recovering the palladium-π-allyl complex.

2. The process of claim 1 in which the olefin has a boiling point of about −35 to +50° C.

3. The process of claim 1 in which the mixture in the reaction zone is agitated for about 30–180 minutes.

4. The process of claim 1 in which the temperature within the reaction zone is maintained at about 20–30° C.

5. The process of claim 1 in which X is chloride ion.

6. The process of claim 1 in which the olefin is selected from the group consisting of mono-olefins having 3–10 carbon atoms per molecule.

7. The process of claim 1 in which the weakly basic sodium salt is selected from the group consisting of sodium carbonate, sodium bicarbonate, disodium hydrogen phosphate, sodium acetate, sodium formate.

8. The process of claim 1 in which the inert solvent is selected from the group consisting of saturated aliphatic hydrocarbons containing 4–10 carbon atoms, saturated cycloaliphatic hydrocarbons containing 4–10 carbon atoms, aromatic hydrocarbons containing 6–12 carbon atoms, chlorinated hydrocarbons containing 1–4 carbon atoms and nitroalkanes containing 1–4 carbon atoms.

9. The process of claim 1 in which the palladium-$\pi$-allyl complex is separated from the reaction mixture by filtering off solid material consisting essentially of the weakly basic sodium salt and reaction products of said salt and removing excess solvent from the resulting filtrate by evaporation under reduced pressure.

10. A process for preparing a palladium-$\pi$-allyl complex, said process consisting of:
(a) forming said palladium-$\pi$-allyl complex by forming a first mixture by adding (i) a palladium salt selected from the group consisting of palladium (II) chloride, palladium (II) bromide, palladium (II) iodide, palladium (II) acetate, and palladium (II) formate; (ii) and inert solvent; (iii) a stoichiometric excess of a weakly basic sodium salt; and (iv) a stoichiometric excess of a mono-olefin having a boiling point within the range of about —40 to +200° C. to a reaction zone provided with agitating means, and agitating said first mixture for about 15–600 minutes while maintaining the temperature within said zone at about 0–50° C.; and
(b) separating and recovering said palladium-$\pi$-allyl complex.

References Cited

UNITED STATES PATENTS 3,119,861    1/1964    Blackham            260—544

OTHER REFERENCES

Guy et al., Advances in Inorganic and Radio Chemistry, vol. IV (1962), Academic Press, New York, N.Y., pp. 97–98 and 114–117.

TOBIAS E. LEVOW, Primary Examiner

A. P. DEMERS, Assistant Examiner

U.S. Cl. X.R.

252—431; 260—94.3